United States Patent [19]
Takeda et al.

[11] Patent Number: 5,626,973
[45] Date of Patent: May 6, 1997

[54] MAGNETO-OPTICAL LAYER AND MAGNETO-OPTICAL RECORDING MEDIUM

[75] Inventors: Yoshihiko Takeda, Hino; Tomokazu Umezawa, Hachioji; Kiyoshi Chiba, Chofu, all of Japan

[73] Assignee: Teijin Limited, Osaka, Japan

[21] Appl. No.: 283,197

[22] Filed: Aug. 4, 1994

Related U.S. Application Data

[63] Continuation-in-part of Ser. No. 79,946, Jun. 23, 1993, abandoned.

[30] Foreign Application Priority Data

| Jun. 25, 1992 | [JP] | Japan | 4-167551 |
| Sep. 20, 1992 | [JP] | Japan | 4-258233 |
| Aug. 9, 1993 | [JP] | Japan | 5-197260 |
| Aug. 9, 1993 | [JP] | Japan | 5-197261 |
| Aug. 9, 1993 | [JP] | Japan | 5-197262 |
| Aug. 9, 1993 | [JP] | Japan | 5-197263 |

[51] Int. Cl.[6] .................................................. G11B 5/66
[52] U.S. Cl. .................... 428/694 ML; 428/94 SC; 428/694 T; 428/694 MT; 428/694 RE; 428/900; 420/433; 420/435; 420/462; 420/466; 148/313; 148/425
[58] Field of Search .................... 428/694 SC, 694 T, 428/694 ML, 694 MF, 900, 694 RE; 420/433, 435, 462, 466; 148/313, 425

[56] References Cited

U.S. PATENT DOCUMENTS

| 3,755,796 | 8/1973 | Griest, Jr. | 252/62.53 |
| 4,438,066 | 3/1984 | Aboaf et al. | 420/435 |
| 4,995,923 | 2/1991 | Mizumoto et al. | 148/304 |

FOREIGN PATENT DOCUMENTS

| 77103907 | 8/1990 | China . |
| 81204568 | 10/1994 | China . |
| 0449252 | 10/1991 | European Pat. Off. . |
| 0530913 | 3/1993 | European Pat. Off. . |
| 60-140803 | 7/1985 | Japan . |
| 42054 | 2/1988 | Japan . |

OTHER PUBLICATIONS

C.J. Lin et al, "Evaporated CoPt alloy films with strong pependicular magnetic anisotropy", Applied Phys. Lett. 61(13).

K.H.J. Buschow et al, "Magneto–Optical Properties of Metallic Ferromagnetic Materials", Journal of Magnetism and Magnetic Materials, 38 (1983).

Applied Physics Letters, vol. 61, No. 13, 1992, pp. 1600–1602, C.J. Lin et al, "Evaporated CoPt alloy films with strong perpendicular magnetic anistropy".

IBM Technical Disclosure Bulletin, vol. 34, No. 78, Dec. 1991, pp. 6–7, "Large perpendicular magnetic anisotropy in Co/Ru multi–layered structures".

Patent Abstracts of Japan, vol. 16, No. 505, Oct. 19, 1992.

*Primary Examiner*—Leszek Kiliman
*Attorney, Agent, or Firm*—Sughrue, Mion, Zinn, Macpeak & Seas

[57] ABSTRACT

A magneto-optical layer sensitive to a light with a short wavelength such as 400 to 550 nm and having a perpendicular magnetization can be deposited on a substrate at a room temperature. The magneto-optical layer is of a tertiary polycrystalline having a composition, for example, $Co_aPt_bRu_c$ where $20 \leq a \leq 70$, $10 \leq b \leq 70$, $10 \leq c \leq 60$ and $a+b+c=100$ or $Co_dPt_eRe_f$ where $d \leq 80$, $5 \leq e$, $5 \leq f$, $40 \leq 4d-5f$ and $d+e+f=100$, and has an easy magnetization axis perpendicular to the main surface of the layer.

22 Claims, 8 Drawing Sheets

MAGNETO-OPTICAL LAYER AND MAGNETO-OPTICAL RECORDING MEDIUM

CROSS REFERENCE TO RELATED APPLICATION

This application is a continuation-in-part application of U.S. patent application Ser. No. 08/079,946, filed Jun. 23, 1993, now abandoned.

BACKGROUND OF THE INVENTION

1. Field of the Invention

The present invention relates to a magneto-optical layer utilizing a magneto-optical effect, particularly useful as a recording layer in a magneto-optical recording medium, and also relates to such a magneto-optical recording medium.

2. Description of the Related Art

Optical recording media have been widely investigated and developed as high density and large capacity information recording media. Particularly, since magneto-optical recording media can be repeatedly recorded on and erased and thus have wide applicable fields, various types of magneto-optical recording media have been proposed.

Heretofore, a laser beam having a wavelength of 830 nm has been usually used in most magneto-optical recording systems. Nevertheless, in future systems to attain a higher density recording, laser beams having a wavelength shorter than that of the laser beam currently used and ranging 400 to 550 nm are expected to be used.

Conventional magneto-optical recording media use a magneto-optical recording layer of amorphous rare earth-transition metal alloy such as TbFeCo having an easy magnetization axis perpendicular to the main surface of the layer. Nevertheless, these amorphous rare earth-transition metal alloy recording layers do not have an effective magneto-optical effect in the shorter wavelength range as above.

To attain a magneto-optical recording layer having a magneto-optical recording effect at such a shorter wavelength and a perpendicular magnetic anisotropy, Co/Pt multi-layers having a structure in which platinum and cobalt layers are alternately stacked have been vigorously investigated to make them practical to use. This Co/Pt multi-layer is however disadvantageous since it requires a complex process of formation due to a multi-layer structure, which significantly lowers productivity.

It is also well known that a CoPt binary alloy layer has excellent magneto-optical characteristics at the short wavelength (see, for example, K. H. J. Buschow et al., J. Magn. Mat., 38, 1(1983)).

This CoPt layer however is required to be deposited on a substrate heated to 200° C. in electron beam evaporation method, in order to obtain a magneto-optical layer having a perpendicular magnetization anisotropy (C. J. Lin et al., Appl. Phys. Lett., 61, 1600 (1992)). This is disadvantageous in terms of productivity and further it is impossible to deposit such a magneto-optical recording layer on a plastic substrate such as a polycarbonate substrate used in current magneto-optical recording media.

The object of the present invention is therefore to provide a magneto-optical layer having a magneto-optical effect at a wavelength shorter than a wavelength currently used, the magneto-optical layer being able to be deposited at room temperature, without necessity of a complex process of production such as that for a multi-layer super lattice structure.

SUMMARY OF THE INVENTION

The above and other objects and features of the present invention are attained by providing a magneto-optical layer of a polycrystalline tertiary or quaternary alloy, having an easy magnetization axis perpendicular to the main surface of the magneto-optical layer and having a composition represented by one of the following:

(i) $Co_aPt_bRu_c$ where $20 \leq a \leq 70$, $10 \leq b \leq 70$, $10 \leq c \leq 60$ and $a+b+c=100$;

(ii) $Co_dPt_eRe_f$ where $d \leq 80$, $5 \leq e$, $5 \leq f$, $40 \leq 4d-5f$ and $d+e+f=100$;

(iii) $Co_gPt_hRe_iRu_j$ where
$15 \leq g(2g+2h+j)/(2g+2h) \leq 80$,
$5 \leq h(2g+2h+j)/(2g+2h)$,
$5 \leq i+(j/2)$,
$2g(2g+2h+j)/(2g+2h) \leq 3i+(3j/2)$,
$g+h+i+j=100$, and
$ghij \neq 0$;

(iv) $Co_kPt_lW_m$ where $30 \leq k \leq 75$, $1 \leq l \leq 20$ and $k+l+m=100$;

(v) $Co_nPt_pMo_q$ where $50 \leq n \leq 85$, $10 \leq p$, $3-q \leq 20$, $n-q \geq 40$ and $n+p+q=100$;

(vi) $Co_rPt_sNb_t$ where $60 \leq r \leq 80$, $1 \leq c \leq 5$, and $r+s+t=100$; and (vii) $Co_uPt_vTa_w$ wherein $40 \leq u \leq 80$, $1 \leq w \leq 5$ and $u+v+w=100$.

In a first aspect of the present invention there is provided a magneto-optical layer of a tertiary alloy of Co, Pt and Ru having a composition of $Co_aPt_bRu_c$ where $20 \leq a \leq 70$, $10 \leq b \leq 70$, $10 \leq c \leq 60$ and $a+b+c=100$, said magneto-optical layer having an easy magnetization axis perpendicular to the main surface of the magneto-optical layer. This composition range is represented by an area ABCDE in FIG. 1.

It is preferred that an external magnetic field for attaining a magnetic saturation of a magneto-optical layer is low in order to lower the external magnetic field necessary for recording information in a recording layer. In this respect, to attain the magnetization saturation of the above magneto-optical layer by an external magnetic field of 6 kOe or less applied in a direction perpendicular to the main surface of the layer, the above CoPtRu tertiary alloy should have a composition of $a \leq 70$, $10 \leq b$, $10 \leq c$ and $a+b+c=100$. Further, in this range of the composition, it is possible to obtain a perpendicular magnetization layer at room temperature by controlling the other conditions of deposition. For example, by making the thickness of the layer 20 nm or less, the deposited layer becomes a perpendicular magnetization layer and has an improved squareness of the hysteresis loop. Furthermore, a perpendicular magnetization layer can be easily obtained by depositing a magneto-optical layer at a temperature heated but lower than 120° C., where the layer has the above composition. A temperature lower than 120° C. is acceptable for a plastic substrate such as a polycarbonate substrate.

On the other hand, in the composition where $20 \leq a$, $b \leq 70$ and $c \leq 60$, the magneto-optical layer can have a Curie temperature of room temperature or above. Although the recording sensitivity of a magneto-optical recording layer increases with a lowering of the Curie temperature of the layer, it is preferred that the magneto-optical recording layer has a considerably higher Curie temperature, e.g., room temperature or higher, to be durable.

In a more preferred embodiment, the magneto-optical layer of a CoPtRu tertiary alloy has a composition $Co_aPt_bRu_c$ where $20 \leq a \leq 40$, $10 \leq b \leq 30$, $40 \leq c \leq 60$ and a+b+c=100. In this range of composition, a perpendicular magnetization layer can be easily obtained by deposition at room temperature. Namely, the layer deposited at room temperature has a positive effective perpendicular magnetic anisotropy energy (the direction of perpendicular magnetization is selected to be positive in the evaluation of the effective perpendicular magnetic anisotropy energy). This preferred range of the composition is represented by an area DEFGHI in FIG. 1.

In a second aspect of the present invention, there is provided a magneto-optical layer of a tertiary alloy of Co, Pt and Re having a composition of $Co_dPt_eRe_f$ wherein $d \leq 80$, $5 \leq e$, $5 \leq f$, $40 \leq 4d-5f$ and $d+e+f=100$, said magneto-optical layer having an easy magnetization layer perpendicular to the main surface of the magneto-optical layer. This composition range is represented by an area JKLM in FIG. 2.

If the above magneto-optical layer has a composition where $d \leq 80$, $5 \leq e$, $5 \leq f$ and $d+e+f=100$, the saturation of magnetization of the layer can be attained by an external magnetic field of 6 kOe or less applied in a direction perpendicular to the main surface of the layer. As a result, a small external magnetic field can be used in recording in the magneto-optical recording layer. Also, in this range of composition, it is possible to obtain a perpendicular magnetization layer by controlling the conditions of a process for deposition at room temperature. For example, the thickness of the layer to 20 nm or less allows a perpendicular magnetization layer to be made and improves the squareness of the hysteresis loop. Furthermore, a perpendicular magnetization layer can be easily obtained by depositing a magneto-optical layer at a temperature heated but lower than 120° C., when the layer has the above composition. The temperature of lower than 120° C. is acceptable for a plastic substrate such as a polycarbonate substrate.

On the other hand, in the composition where $d \leq 80$, $5 \leq e$ and $5 \leq f$, the magneto-optical layer can have a Curie temperature of room temperature or above. Although the recording sensitivity of a magneto-optical recording layer increases with a lowering of the Curie temperature of the layer, it is preferred that the magneto-optical recording layer has a considerably higher Curie temperature, e.g., room temperature or more, to be durable.

In a more preferred embodiment, the magneto-optical layer of a CoPtRe tertiary alloy has a composition $Co_dPt_eRe_f$ where $d \leq 75$, $5 \leq e \leq 45$, $5 \leq f$ and $d+e+f=100$.

In this range of composition, a perpendicular magnetization layer can be easily obtained by deposition at room temperature. Namely, the layer deposited at room temperature has an effective positive perpendicular magnetic anisotropy energy. This composition range is represented by an area NKOPQ in FIG. 2.

In a further preferred embodiment, the magneto-optical layer of a CoPtRe tertiary alloy has a composition $Co_dPt_eRe_f$ where $d \leq 70$, $10 \leq e \leq 45$, $5 \leq f$, $d \geq 3f$ and $d+e+f=100$. In this range of composition, the magneto-optical layer advantageously has a Kerr rotation angle $\theta_k$ of 0.1° or more at a wavelength of 400 nm. This composition range is represented by an area QRSTU in FIG. 2.

In a third aspect of the present invention, it was also found that in the above CoPtRe alloy layer, it is possible to obtain equivalent effects when substituting a portion of Re in the CoPtRe alloy by Ru in an amount of almost double that of Re. The composition of this quaternary alloy magneto-optical layer can be represented by $Co_gPt_hRe_iRu_j$ where $15 \leq g(2g+2h+j)/(2g+2h) \leq 80$, $5 \leq h(2g+2h+j)/(2g+2h)$, $5 \leq i+(j/2)$, $2g(2g+2h+j)/(2g+2h) \leq 3i+(3j/2)$, $g+h+i+j=100$, and $ghij \neq 0$.

This composition range of the quaternary alloy is represented by an area VWXYZ in FIG. 3.

Similarly, as fourth to seventh aspects of the present invention, there are provided a magneto-optical layer of a polycrystalline tertiary or quaternary alloy, having an easy magnetization axis perpendicular to the main surface of the magneto-optical layer and having a composition represented by $Co_kPt_lW_m$ where $30 \leq k \leq 75$, $1 \leq l \leq 20$ and $k+l+m=100$; a magneto-optical layer of a polycrystalline tertiary or quaternary alloy, having an easy magnetization axis perpendicular to the main surface of the magneto-optical layer and having a composition represented by $Co_nPt_pMo_q$ where $50 \leq n \leq 85$, $10 \leq p$, $3 \leq q \leq 20$, $n-q \geq 40$ and $n+p+q=100$; a magneto-optical layer of a polycrystalline tertiary or quaternary alloy, having an easy magnetization axis perpendicular to the main surface of the magneto-optical layer and having a composition represented by $Co_rPt_sNb_t$ where $60 \leq r \leq 80$, $1 \leq c \leq 5$, and $r+s+t=100$; and a magneto-optical layer of a polycrystalline tertiary or quaternary alloy, having an easy magnetization axis perpendicular to the main surface of the magneto-optical layer and having a composition represented by $Co_uPt_vTa_w$ wherein $40 \leq u \leq 80$, $1 \leq w \leq 5$ and $u+v+w=100$.

These composition ranges of the tertiary alloys are represented by an area $\alpha\beta\gamma\delta$ in FIG. 6, an area $\epsilon\zeta\eta\theta\kappa\lambda$ in FIG. 7, an area $\mu\nu\xi\pi$ in FIG. 8 and an area $\rho\sigma\tau\phi$ in FIG. 9, respectively.

In these ranges of the compositions, the magneto-optical layer can has an easy magnetization axis perpendicular to the magneto-optical layer, i.e., the effective perpendicular magnetic anisotropy energy can be positive (the perpendicular direction is positive).

The deposition of the above CoPtRu, CoPtRe, CoPtRuRe, CoPtW, CoPtMo, CoPtNb or CoPtTa, perpendicular magnetization layer can be made by sputtering, evaporation, molecular beam epitaxy (MBE), or the like. The target or evaporation source for these depositions may be a single alloy of CoPtRu, CoPtRe, CoPtRuRe, CoPtW, CoPtMo, CoPtNb or CoPtTa a combination of respective elements of each alloy, or a composite of these. For example, a composite target comprising Pt and Ru and/or Re chips on a Co target may be also used. Heating during the deposition or a heat treatment after the deposition may be adopted to improve characteristics of the magneto-optical layer.

The magneto-optical layer of a tertiary or quaternary alloy of the present invention may further contain one or more elements such as Al, Si, Ti, V, Cr, Mn, Fe, Ni, Cu, Zn, Ga, Ge, Zr, Rh, Ag, In, Sn, Sb, Hf, Ir, Au, Pb, Pd, Bi and so on, as long as they do not destroy the perpendicular magnetization property of the layer. The addition of the above one or more elements may have an effect of improving certain characteristics of the magneto-optical layer.

The magneto-optical layer of the present invention may be also utilized in the form of a stack of alternate magneto-optical layers and metal or dielectric layers, i.e., a super lattice structure magneto-optical layer, which may have an improved efficiency.

The magneto-optical layer of the present invention is polycrystalline. Accordingly, the substrate or an underlying layer or a dielectric layer on which the magneto-optical layer of the present invention is to be deposited is not particularly limited.

The thickness of the magneto-optical layer of the present invention is not particularly limited, but is generally from 1 nm to 100 nm.

The magneto-optical layer of the present invention was developed particularly for use as a magneto-optical recording layer in a magneto-optical recording medium, but can be used in other applications utilizing the magneto-optical property, i.e., magneto-optical elements such as an optical isolator, an optical sensor, and so on.

The present invention also provides a magneto-optical recording medium comprising a substrate and a magneto-optical recording layer formed on the substrate, in which the magneto-optical recording layer is made of a tertiary or quaternary alloy as described above.

The substrate may be typically of glass or plastics such as polycarbonate.

In the magneto-optical recording medium, one or more dielectric and/or metal layers may be provided under and/or over the magneto-optical recording layer. These layers are also known in the current magneto-optical recording media and can be similar to those used in the current magneto-optical recording media using a laser beam having a wavelength of 830 nm or the like, provided that the thickness and other properties of the layers should be preferably adjusted to the used magneto-optical recording layer and laser beam. An organic protecting layer may be further provided.

EXAMPLES

Examples 1 to 15 and Comparative Examples 1 to 12

In a chamber of DC sputtering apparatus, a composite target of a Co target (100 mm diameter) on which Pt and Ru chips were placed in accordance with a composition to be deposited was inserted and a glass substrate was disposed on a water cooled table which faced the composite target. In an argon atmosphere at a pressure of 0.7 Pa (5 mTorr), DC sputtering was conducted at a power of 100 W to deposit a 100 nm thick CoPtRu alloy layer on the glass substrate.

The obtained CoPtRu alloy layer was analyzed by X-ray diffraction to be polycrystalline.

The composition of the obtained CoPtRu alloy layer was analyzed by Auger electron spectrometry and inductive coupled plasma analysis (IPC).

Figure 1:
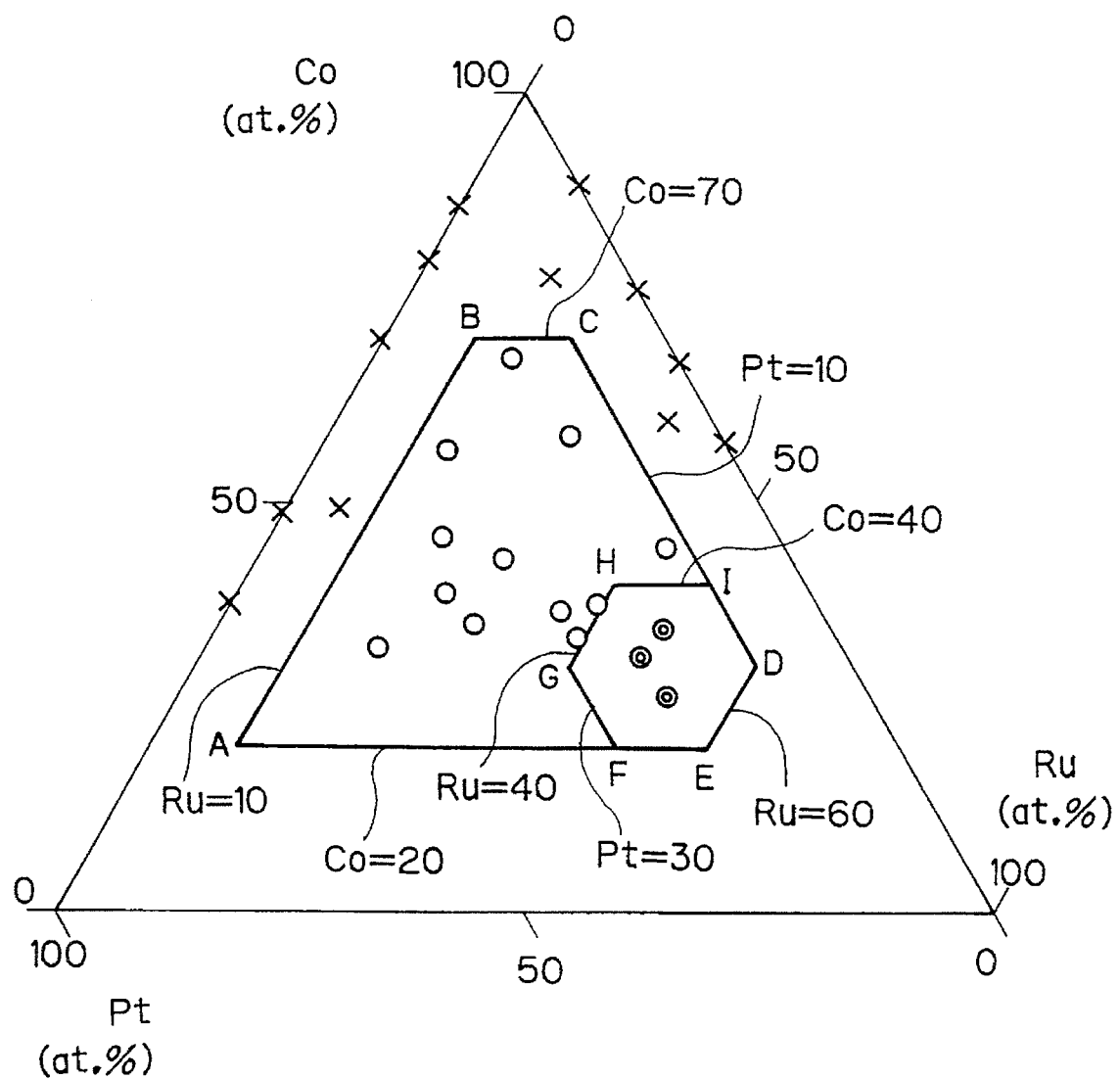
FIG. 1 shows the composition range of CoPtRu alloy of the magneto-optical layer of the present invention.

The compositions of the deposited CoPtRu alloy layers in Examples 1 to 15 and Comparative examples 1 to 12 of the present invention are shown in FIG. 1, in which the bottom line is the axis representing the compositional amount of Pt (the left end is 100 atom % Pt and the right end is 0 atom % Pt), the left declined line is the axis representing the compositional amount of Co (the upper end is 100 atom % and the lower end is 0 atom %), and the right declined line is the axis representing the compositional amount of Ru (the upper end is 0 atom % and the lower end is 100 atom %). The marks ⊙ indicate Examples 1 to 3, marks ○ indicate Examples 4 to 15 and marks × indicate Comparative examples 1 to 12.

Various magnetic properties of the deposited layers were evaluated by a Kerr spectrum measuring apparatus, a vibrating sample magnetometer (VSM) and a magnetic torque meter.

The compositions and evaluated properties of the samples, i.e., the deposited layers are shown in Tables 1 and 2. In Tables 1 and 2, the compositions are expressed by atom %; $K_{eff}$ ($10^6$ erg/cc) denotes an effective magnetic anisotropy energy wherein if it is positive it represents the direction of magnetization perpendicular to the main surface of the magnetic layer (the $K_{eff}$ is a value obtained by dividing the value measured by the magnetic torque meter by the volume of the magnetic recording layer of the sample and was not corrected by the demagnetic energy); $H_s$ (kOe) denotes a perpendicular saturated magnetic field, i.e., an external magnetic field which makes the magnetization of a magnetic layer saturated when the external magnetic field is applied perpendicularly to the magnetic layer; $H_c$ (kOe) denotes a value of coercivity; and $Q_k$ (deg) denotes a saturated Kerr rotation angle measured at a wavelength of 400 nm.

It is seen in Tables 1 and 2 that the perpendicular saturated magnetic field is larger than 6 kOe in Comparative examples 1 to 12, but it is less than 6 kOe in Examples 1 to 15, and that the effective magnetic anisotropy energy is positive in Examples 1 to 3. As described before, the layers having the same compositions as in Examples 4 to 15 could be made to be a perpendicular magnetization layer by controlling the conditions of deposition or by heating the substrate to a temperature below 120° C.

TABLE 1

| Ex. No. | Composition (atom %) | | | Magnetic properties | | | |
|---|---|---|---|---|---|---|---|
| | Co | Pt | Ru | $K_{eff}$ ($10^6$ erg/cc) | $H_s$ (kOe) | $H_c$ (kOe) | $\theta_k$ (deg.) |
| 1 | 27.1 | 21.3 | 51.6 | 0.38 | 2.0 | 1.0 | 0.10 |
| 2 | 34.7 | 18.3 | 47.0 | 0.25 | 2.0 | 1.0 | 0.09 |
| 3 | 31.0 | 22.4 | 46.6 | 0.23 | 3.1 | 0.4 | 0.08 |
| 4 | 44.5 | 13.2 | 42.3 | −0.36 | 5.7 | 1.0 | 0.08 |
| 5 | 38.4 | 23.6 | 38.0 | −0.16 | 4.8 | 0.4 | 0.18 |
| 6 | 34.0 | 28.0 | 38.0 | −0.01 | 3.4 | 0.3 | 0.16 |
| 7 | 37.3 | 26.3 | 36.4 | −0.18 | 4.2 | 0.7 | 0.20 |
| 8 | 42.8 | 30.8 | 26.4 | −0.22 | 5.0 | 0.8 | 0.29 |
| 9 | 32.6 | 49.8 | 17.6 | −1.37 | 5.2 | 0.2 | 0.38 |
| 10 | 39.3 | 38.9 | 21.8 | −0.96 | 4.5 | 0.4 | 0.34 |
| 11 | 35.8 | 37.8 | 26.4 | −0.54 | 4.2 | 0.4 | 0.31 |
| 12 | 46.0 | 36.2 | 17.8 | −0.25 | 5.9 | 0.8 | 0.39 |
| 13 | 57.0 | 30.0 | 13.0 | −0.91 | 5.9 | 1.1 | 0.40 |
| 14 | 59.6 | 15.3 | 25.1 | −1.88 | 5.8 | 0.6 | 0.26 |
| 15 | 68.1 | 18.7 | 13.2 | −10.08 | 5.9 | 0.6 | 0.39 |

TABLE 2

| Com. Ex. No. | Composition (atom %) | | | Magnetic properties | | | |
|---|---|---|---|---|---|---|---|
| | Co | Pt | Ru | $K_{eff}$ ($10^6$ erg/cc) | $H_s$ (kOe) | $H_c$ (kOe) | $\theta_k$ (deg.) |
| 1 | 37.9 | 62.1 | 0.0 | −2.40 | 9.0 | 0.1 | 0.44 |
| 2 | 49.3 | 50.7 | 0.0 | −1.90 | 7.0 | 0.4 | 0.55 |
| 3 | 49.6 | 44.1 | 6.4 | −1.53 | 6.8 | 0.4 | 0.42 |
| 4 | 69.9 | 30.1 | 0.0 | −1.60 | >10.0 | 1.2 | 0.43 |
| 5 | 79.4 | 20.6 | 0.0 | −5.80 | >10.0 | 1.3 | 0.47 |

TABLE 2-continued

| Com. Ex. No. | Composition (atom %) | | | $K_{eff}$ (10$^6$ erg/cc) | $H_s$ (kOe) | $H_c$ (kOe) | $\theta_k$ (deg.) |
|---|---|---|---|---|---|---|---|
| | Co | Pt | Ru | | | | |
| 6 | 85.9 | 14.1 | 0.0 | −9.00 | >10.0 | 1.0 | 0.50 |
| 7 | 60.1 | 4.6 | 35.3 | −4.06 | >10.0 | 0.5 | 0.11 |
| 8 | 51.3 | 0.0 | 48.7 | −0.80 | 8.0 | 0.0 | 0.09 |
| 9 | 66.7 | 0.0 | 33.3 | −4.09 | >10.0 | 0.3 | 0.19 |
| 10 | 76.5 | 0.0 | 23.5 | −6.77 | >10.0 | 0.3 | 0.26 |
| 11 | 88.8 | 0.0 | 11.2 | −10.15 | >10.0 | 0.2 | 0.33 |
| 12 | 77.4 | 9.2 | 13.4 | −10.08 | >10.0 | 0.5 | 0.33 |

Examples 16 to 32 and Comparative Examples 13 to 25

In a chamber of a DC sputtering apparatus, a composite target of a Co target (100 mm diameter) on which Pt and Re chips were placed in accordance with a composition to be deposited was inserted, and a glass substrate was disposed on a water cooled table which faced the composite target. In an argon atmosphere at a pressure of 0.7 Pa (5 mTorr), DC sputtering was conducted at a power of 100 W to deposit a 100 nm thick CoPtRe alloy layer on the glass substrate.

The obtained CoPtRe alloy layer was analyzed by X-ray diffraction to be polycrystalline.

The composition of the obtained CoPtRe alloy layer was analyzed by Auger electron spectrometry and inductive coupled plasma analysis (ICP).

Figure 2:
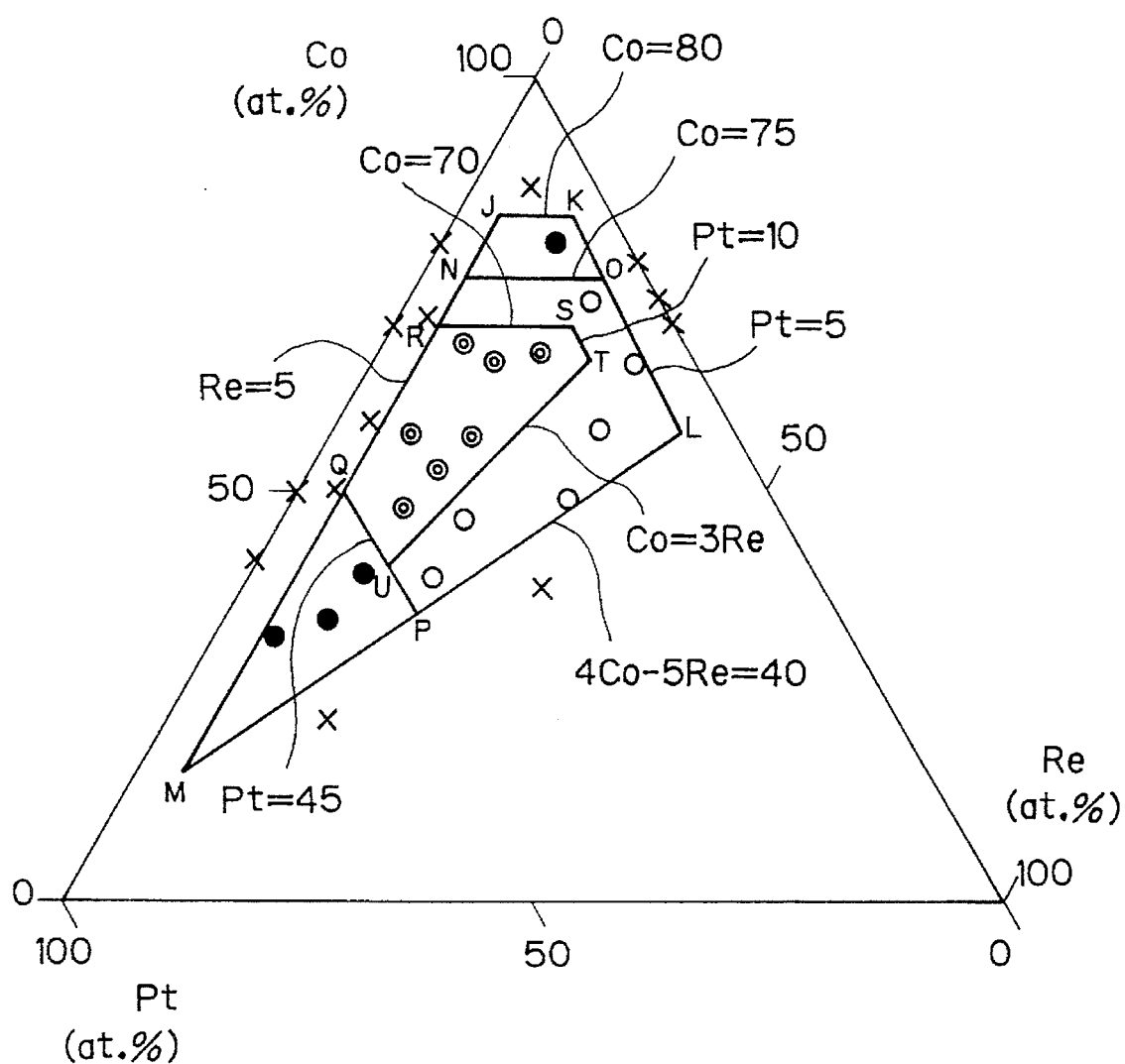
FIG. 2 shows the composition range of CoPtRe alloy of the magneto-optical layer of the present invention.
Figure 3:
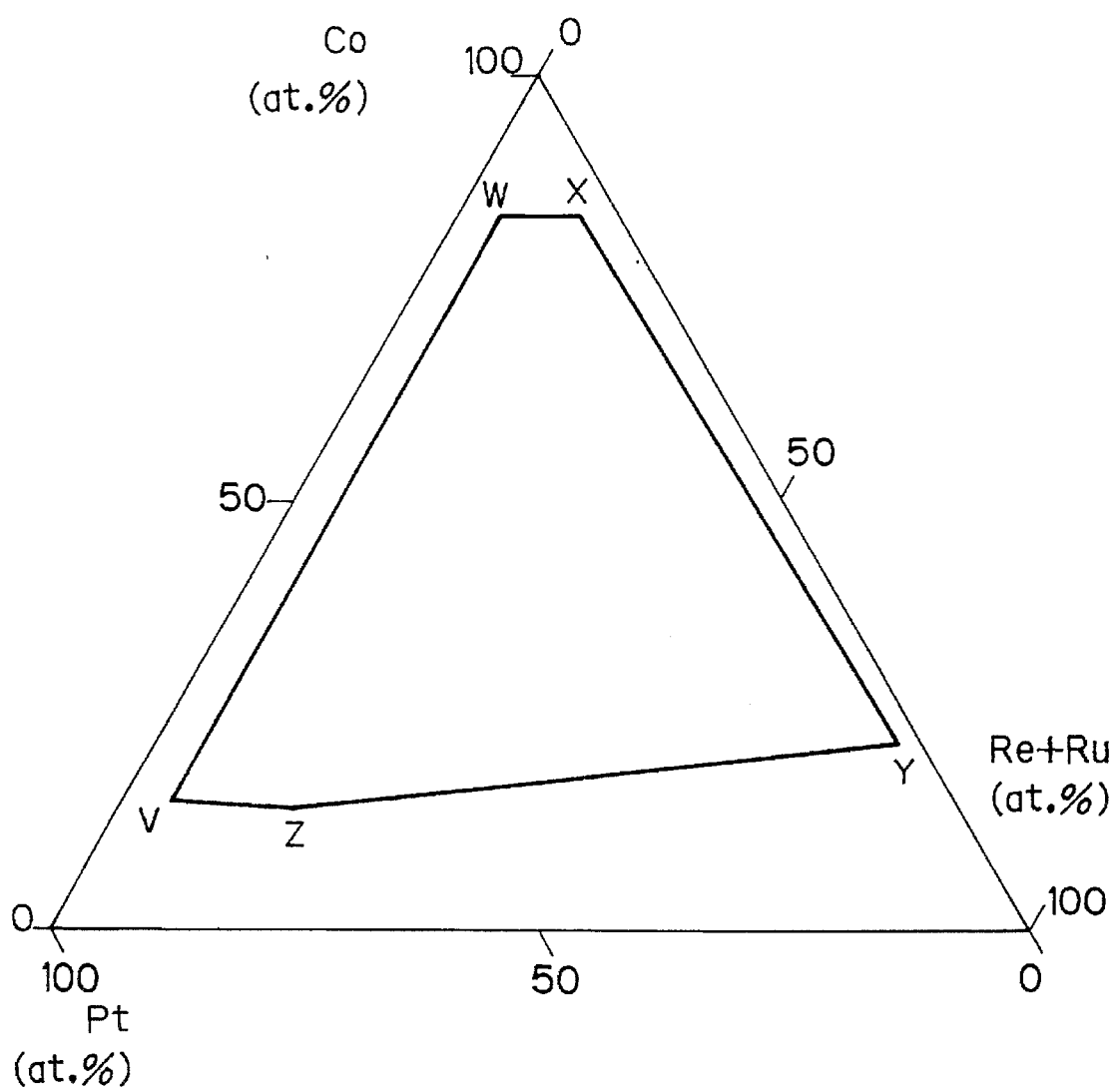
FIG. 3 shows the composition range of CoPtReRu alloy of the magneto-optical layer of the present invention.

The compositions of the deposited CoPtRe alloy layers in Examples 16 to 32 and Comparative examples 13 to 25 are shown in FIG. 2, in which the bottom line is the axis representing the compositional amount of Pt (the left end is 100 atom % Pt and the right end is 0 atom % Pt), the left declined line is the axis representing the compositional amount of Co (the upper end is 100 atom % and the lower end is 0 atom %), and the right declined line is the axis representing the compositional amount of Re (the upper end is 0 atom % and the lower end is 100 atom %). The marks ⊚ indicate Examples 16 and 18 to 23, marks ○ indicate Examples 17 and 24 to 28, marks ● Examples 29 to 32, and marks × indicate Comparative examples 13 to 25.

Various magnetic properties of the deposited layers were evaluated by a Kerr spectrum measuring apparatus, a vibration sample magnetometer (VSM) and a magnetic torque meter.

The compositions and evaluated properties of the samples, i.e., the deposited layers are shown in Tables 3 and 4.

It is seen in Tables 3 and 4 that the magnetization at room temperature is zero in Comparative examples 19 and 24, and the perpendicular saturated magnetic field is larger than 6 kOe in Comparative examples 13 to 18, 20 to 23 and 25, but it is less than 6 kOe in Examples 16 to 32, and that the effective magnetic anisotropy energy is positive in Examples 16 to 28. As described before, the layers having the same compositions as in Examples 29 to 32 could be made to be a perpendicular magnetization layer by controlling the conditions of deposition or by heating the substrate to a temperature below 120° C.

Further, it is seen that the Kerr rotation angle $\theta_K$ is larger than 0.1° in Examples 16 and 18 to 23.

TABLE 3

| Ex. No. | Composition (atom %) | | | $K_{eff}$ (10$^6$ erg/cc) | $H_s$ (kOe) | $H_c$ (kOe) | $\theta_k$ (deg.) |
|---|---|---|---|---|---|---|---|
| | Co | Pt | Re | | | | |
| 16 | 53.9 | 34.8 | 11.3 | 0.98 | 3.30 | 0.9 | 0.22 |
| 17 | 46.4 | 34.3 | 19.4 | 0.34 | 1.50 | 0.5 | 0.08 |
| 18 | 68.9 | 23.1 | 8.1 | 2.19 | 4.90 | 0.9 | 0.28 |
| 19 | 57.4 | 34.8 | 7.8 | 0.88 | 5.60 | 1.2 | 0.31 |
| 20 | 65.7 | 21.5 | 12.7 | 1.59 | 3.70 | 0.6 | 0.23 |
| 21 | 47.7 | 40.1 | 12.2 | 0.98 | 3.60 | 0.8 | 0.20 |
| 22 | 66.3 | 16.3 | 17.4 | 1.97 | 2.90 | 0.1 | 0.14 |
| 23 | 56.6 | 27.8 | 15.7 | 1.50 | 2.20 | 1.3 | 0.12 |
| 24 | 72.9 | 6.7 | 20.4 | 0.37 | 2.40 | 0.1 | 0.06 |
| 25 | 64.5 | 6.9 | 28.6 | 0.11 | 3.50 | 0.1 | 0.01 |
| 26 | 57.1 | 13.9 | 29.0 | 0.20 | 3.20 | 0.1 | 0.01 |
| 27 | 48.7 | 21.1 | 30.1 | 0.16 | 1.60 | 0.3 | 0.00 |
| 28 | 39.6 | 40.9 | 19.5 | 0.19 | 3.40 | 0.6 | 0.02 |
| 29 | 79.2 | 7.5 | 13.3 | −0.24 | 4.30 | 0.1 | 0.19 |
| 30 | 40.0 | 48.6 | 11.4 | −0.39 | 3.50 | 0.4 | 0.07 |
| 31 | 34.5 | 54.0 | 11.5 | −0.39 | 3.10 | 0.1 | 0.08 |
| 32 | 33.0 | 59.8 | 7.3 | −0.87 | 4.90 | 0.3 | 0.08 |

TABLE 4

| Com. Ex. No. | Composition (atom %) | | | $K_{eff}$ (10$^6$ erg/cc) | $H_s$ (kOe) | $H_c$ (kOe) | $\theta_k$ (deg.) |
|---|---|---|---|---|---|---|---|
| | Co | Pt | Re | | | | |
| 13 | 49.3 | 50.7 | 0.0 | −1.90 | 7.00 | 0.4 | 0.55 |
| 14 | 69.9 | 30.1 | 0.0 | −1.60 | >10.0 | 1.2 | 0.47 |
| 15 | 79.4 | 20.6 | 0.0 | −5.80 | >10.0 | 1.3 | 0.26 |
| 16 | 77.7 | 0.0 | 22.3 | −0.32 | 8.00 | 0.0 | 0.08 |
| 17 | 73.2 | 0.0 | 26.8 | −0.10 | 7.00 | 0.0 | 0.04 |
| 18 | 73.0 | 0.0 | 29.1 | −0.04 | 7.00 | 0.0 | 0.02 |
| 19 | 38.5 | 29.9 | 31.6 | 0.00 | 0.00 | 0.0 | 0.00 |
| 20 | 70.4 | 25.3 | 4.4 | −0.74 | 7.60 | 1.2 | 0.40 |
| 21 | 57.7 | 38.0 | 4.4 | −0.83 | 7.40 | 1.1 | 0.40 |
| 22 | 50.6 | 45.5 | 3.9 | −0.78 | 6.60 | 0.7 | 0.41 |
| 23 | 37.9 | 62.1 | 0.0 | −2.40 | 9.00 | 0.1 | 0.46 |
| 24 | 22.0 | 60.0 | 18.0 | 0.00 | 0.00 | 0.0 | 0.00 |
| 25 | 86.9 | 8.6 | 4.6 | −5.56 | 14.50 | 1.3 | 0.36 |

EXAMPLE 33

In a chamber of a DC sputtering apparatus, a composite target of a Co target (100 mm diameter) on which Pt and Ru chips were placed in accordance with a composition to be deposited was inserted and a silicon substrate having a 20 nm thick AlSiN amorphous dielectric layer thereon was disposed on a water cooled table which faced the composite target. In an argon atmosphere at a pressure of 0.7 Pa (5 mTorr), DC sputtering was conducted at a power of 100 W to deposit a 9.3 nm thick CoPtRu alloy layer on the AlSiN dielectric layer.

The obtained CoPtRu alloy layer was analyzed by X-ray diffraction to be polycrystalline.

Figure 4:
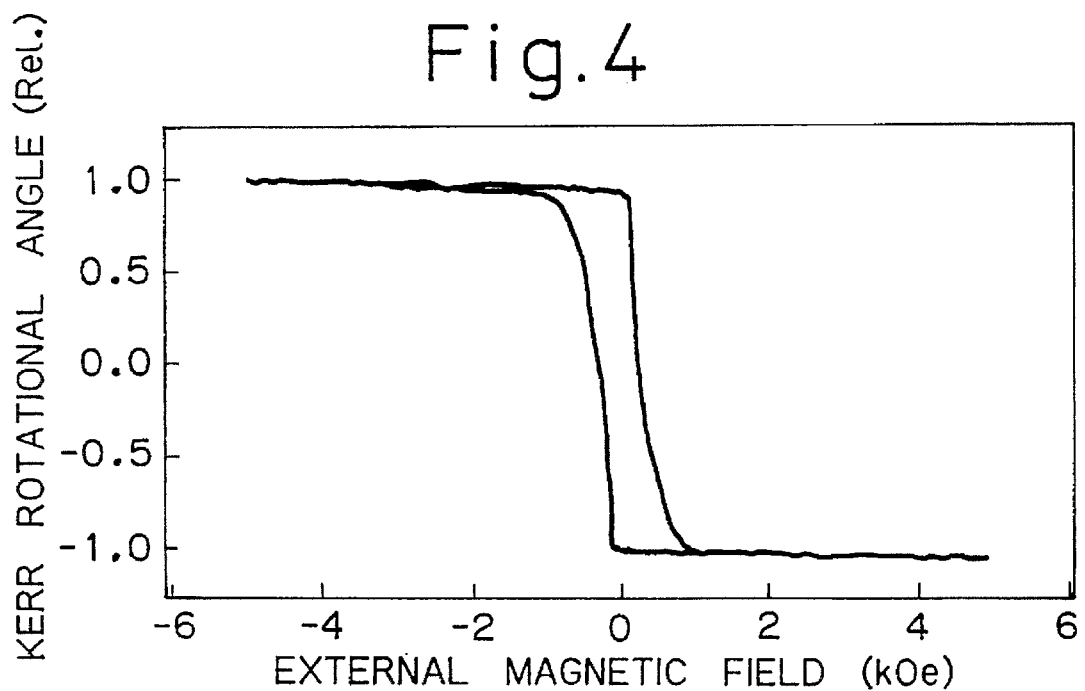
FIG. 4 shows the Kerr hysteresis curve of a CoPtRu tertiary alloy layer in an Example.

This CoPtRu alloy layer had a composition of 53.6 atom % Co, 30.4 atom % Pt and 16.0 atom % Ru, a saturated Kerr rotation angle at a wavelength of 400 nm of 0.33 deg, and an effective magnetic anisotropy energy of 5.4×10$^5$ erg/cc, indicating a perpendicular magnetization layer. FIG. 4 shows the Kerr hysteresis curve of the alloy layer, in which the abscissa represents an external magnetic field applied perpendicularly to the main surface of the layer and the ordinate represents a relative value of the Kerr rotation angle with the saturated Kerr rotation angle. The remanence that is a ratio of the saturated Kerr rotation angle to the residual Kerr rotation angle was 0.95.

EXAMPLE 34

In a chamber of DC sputtering apparatus, a composite target of a Co target (100 nm diameter) on which Pt, Re and Ru chips were placed was inserted and a silicon substrate having a 20 nm thick AlSiN amorphous dielectric layer thereon was disposed on a water cooled table which faced the composite target.

In an argon atmosphere at a pressure of 0.7 Pa (5 mTorr), DC sputtering was conducted at a power of 100 W to deposit a 11.2 nm thick CoPtReRu alloy layer on the AlSiN dielectric layer.

The CoPtReRu alloy layer had a composition of 48.8 atom % Co, 26.5 atom % Pt, 9.1 atom % Re and 15.6 atom % Ru, a saturated Kerr rotation angle at a wavelength of 400 nm of 0.23 deg, and an effective magnetic anisotropy energy of $1.2 \times 10^5$ erg/cc. The squareness ratio was 0.95.

EXAMPLE 35

A magneto-optical recording medium was prepared by successively depositing, on a grooved polycarbonate disc having a diameter of 130 mm, a thickness of 1.2 mm and a track pitch of 1.0 μm, an AlSiN amorphous dielectric layer 20 mm thick, a CoPtRe alloy magneto-optical layer 10 nm thick, an AlSiN amorphous dielectric layer 50 nm thick, and an $Al_{95}Au_5$ alloy layer 25 nm thick. The CoPtRe recording layer had a composition of 72.9 atom % Co, 20.3 atom % Pt and 6.8 atom % Re.

Magneto-optical recording was performed on this magneto-optical recording disc. The laser used for recording and reproducing was a laser beam having a wavelength of 533 nm, the linear speed was 5.56 m/sec, the recording frequency was 1.39 MHz, the recording external magnetic field was 200 Oe, and the reproducing laser power was 1.5 mW.

Figure 5:
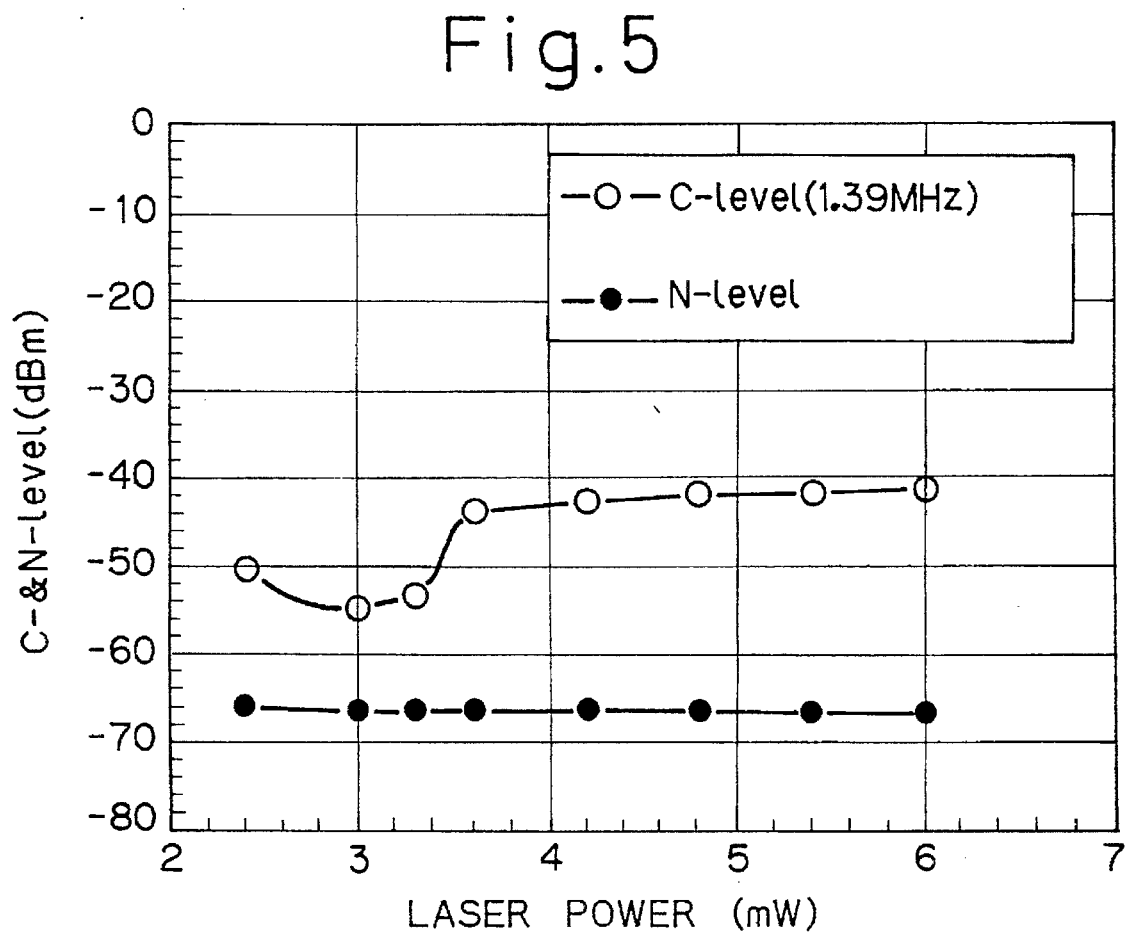
FIG. 5 shows the recording and reproducing characteristics of a magneto-optical recording medium comprising a CoPtRe alloy recording layer.

FIG. 5 shows the recording and reproducing characteristics of the magneto-optical recording disc. The abscissa represents the power of the recording laser beam and the ordinate represents the levels of the carrier (c) and noise (N).

As seen in FIG. 5, the recording and reproducing could be performed at a laser wavelength of 533 nm and the maximum carrier to noise ratio was 25.4 dB.

Examples 36 to 43 and Comparative Examples 26 to 30

In a chamber of a DC sputtering apparatus a complex target of Pt chips or Pt and W chips on a Co target (100 μm diameter) was set in accordance with the composition of a layer to be deposited. A silicon substrate was set on a support faciing the complex target. The atmosphere in the chamber was Ar with a pressure of 0.67 Pa or 1.3 P. Sputtering was conducted at a discharge power of 100 W to deposit a CoPt or CoPtW alloy layer with a thickness of 7 to 11 nm onto a 20 nm AlSiN amorphous dielectric layer formed on the silicon substrate. The X-ray diffraction analysis revealed that the deposited CoPtW alloy layers were polycrystalline.

Figure 6:
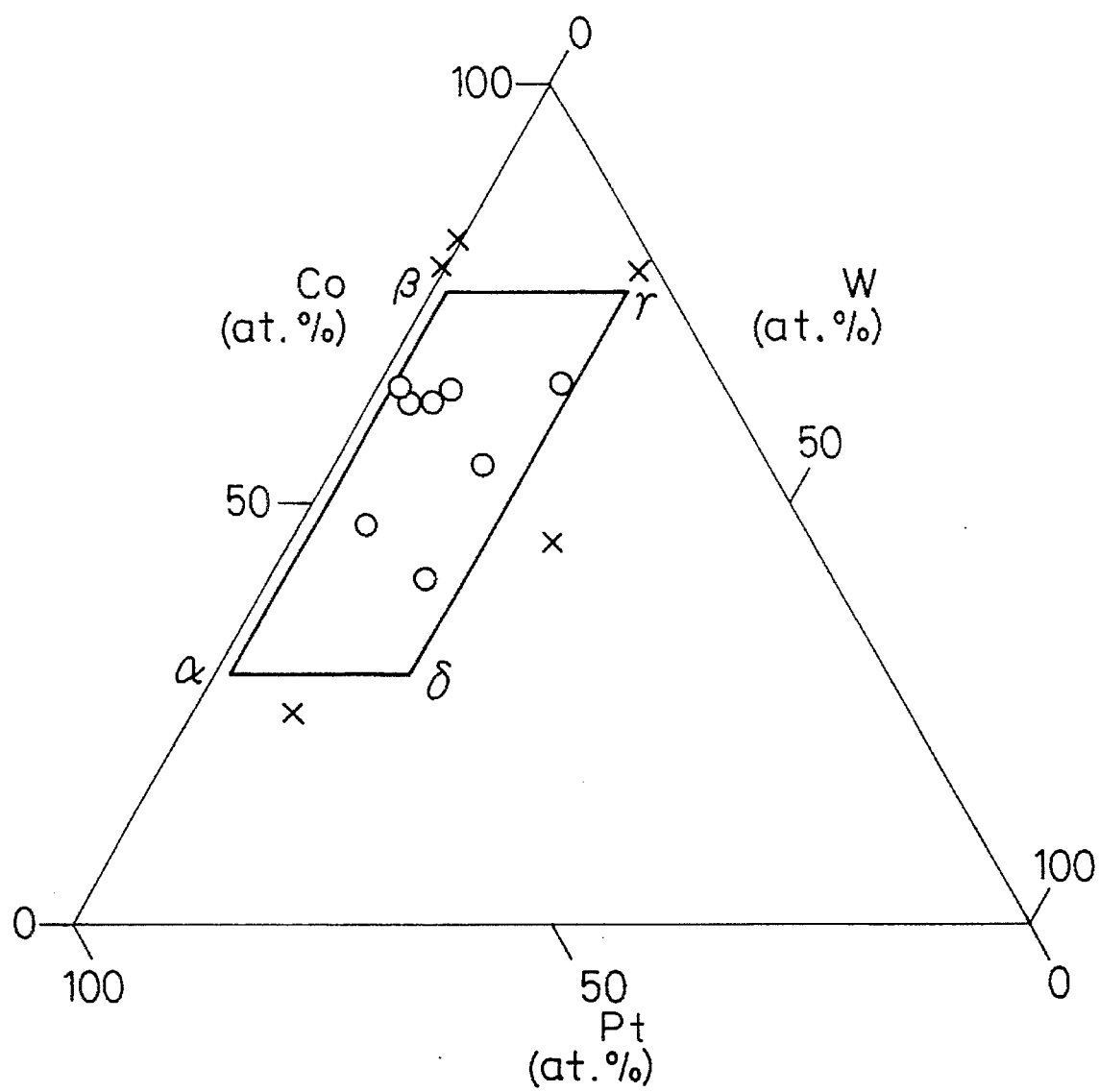
FIGS. 6 to 9 show the composition ranges of the CoPtW, CoPtMo, CoPtNb and CoPtTa alloys of the magneto-optical layers of the present invention.

FIG. 6 shows the compositions of the CoPt and CoPtW layers thus deposited as Examples 36 to 43 and Comparative Examples 26 to 30. In FIG. 6, the bottom line indicates the compositional ratio of Pt (the left end is 100 atomic % and the right end is 0 atomic %), the left declined line indicates the compositional ratio of Co (the upper end is 100 atomic % and the lower end is 0 atomic %), and the right declined line indicates the compositional ratio of W (the lower end is 100 atomic % and the upper end is 0 atomic %). The marks ○ stand for Examples 36 to 43 and the marks × stand for Comparative Examples 26 to 30.

The compositions of the deposited CoPt and CoPtW layers were determined by Auger electron analysis. Various magnetic properties of the layers were measured and evaluated using a Circular Polarization Modification Kerr Spectrum Measuring Apparatus, a vibrating sample magnetometer (VSM) and a magnetic torquemeter.

The thus obtained compositions and properties of the deposited layers are shown in Table 5. In Table 5, the compositions are in atomic %. $K_{eff}$ in $10^6$ erg/cc stands for the effective magnetic anisotropy, in which the positive value indicates the direction perpendicular to the magnetic layer. It should be noted that the $k_{eff}$ was obtained by the value measured by the magnetic torquemeter divided by the volume of the magnetic layer but correction for demagnetic energy was not carried out. $H_s$ stands for a perpendicular saturation magnetic field, i.e., an external magnetic field which makes the magnetization of a magnetic layer saturated when the external magnetic field is applied perpendicularly to the magnetic layer. $H_c$ in kOe stands for the perpendicular coercive force and $\theta_k$ in deg stands for the absolute value of the saturated Kerr rotation angle measured with a wavelength of 400 nm.

In Comparative Examples 26 to 30, the effective magnetic anisotropies were negative, but they were positive in Examples 36 to 43.

TABLE 5

| Sample No. | Composition (atom %) | | | Magnetic properties | | | |
|---|---|---|---|---|---|---|---|
| | Co | Pt | W | $K_{eff}$ ($10^6$ erg/cc) | $H_s$ (kOe) | $H_c$ (kOe) | $\theta_k$ (deg.) |
| Ex. 36 | 61.6 | 35.5 | 2.9 | 1.96 | 0.3 | 0.4 | 0.37 |
| Ex. 37 | 64.2 | 27.0 | 8.8 | 2.01 | 0.1 | 0.3 | 0.34 |
| Ex. 38 | 62.1 | 33.1 | 4.8 | 0.92 | 0.5 | 0.9 | 0.38 |
| EX. 39 | 63.7 | 31.9 | 4.4 | 1.87 | 0.2 | 0.5 | 0.38 |
| Ex. 40 | 54.3 | 30.1 | 15.7 | 2.58 | 0.4 | 0.4 | 0.32 |
| Ex. 41 | 41.3 | 42.0 | 16.7 | 1.65 | 1.0 | 0.7 | 0.26 |
| Ex. 42 | 49.4 | 43.3 | 7.3 | 1.14 | 3.0 | 1.1 | 0.37 |
| Ex. 43 | 64.2 | 17.5 | 18.3 | 0.76 | 3.0 | 0.3 | 0.25 |
| Com. Ex. 26 | 80.2 | 19.8 | 0.0 | −3.10 | 2.5 | 0.5 | 0.50 |
| Com. Ex. 27 | 77.4 | 22.6 | 0.0 | −2.60 | 1.5 | 0.6 | 0.48 |
| Com. Ex. 28 | 26.0 | 62.0 | 12.0 | −1.40 | 1.5 | 0.2 | 0.10 |
| Com. Ex. 29 | 45.7 | 28.2 | 26.1 | −1.48 | 3.0 | 0.1 | 0.13 |
| Com. Ex. 30 | 77.1 | 2.5 | 20.4 | −1.16 | 2.0 | 0.2 | 0.28 |

Examples 44 to 50 and Comparative Examples 27 to 31

In a chamber of a DC sputtering apparatus a complex target of Pt chips or Pt and Mo chips on a Co target (100 mm diameter) was set in accordance with the composition of a layer to be deposited. A silicon substrate was set on a support faciing the complex target. The atmosphere in the chamber was Ar with a pressure of 0.67 Pa or 1.3 P. Sputtering was conducted at a discharge power of 100 W to deposit a CoPt or CoPtMo alloy layer with a thickness of 7 to 11 nm onto a 20 nm AlSiN amorphous dielectric layer formed on the silicon substrate. The X-ray diffraction analysis revealed that the deposited CoPtMo alloy layers were polycrystalline.

Figure 7:
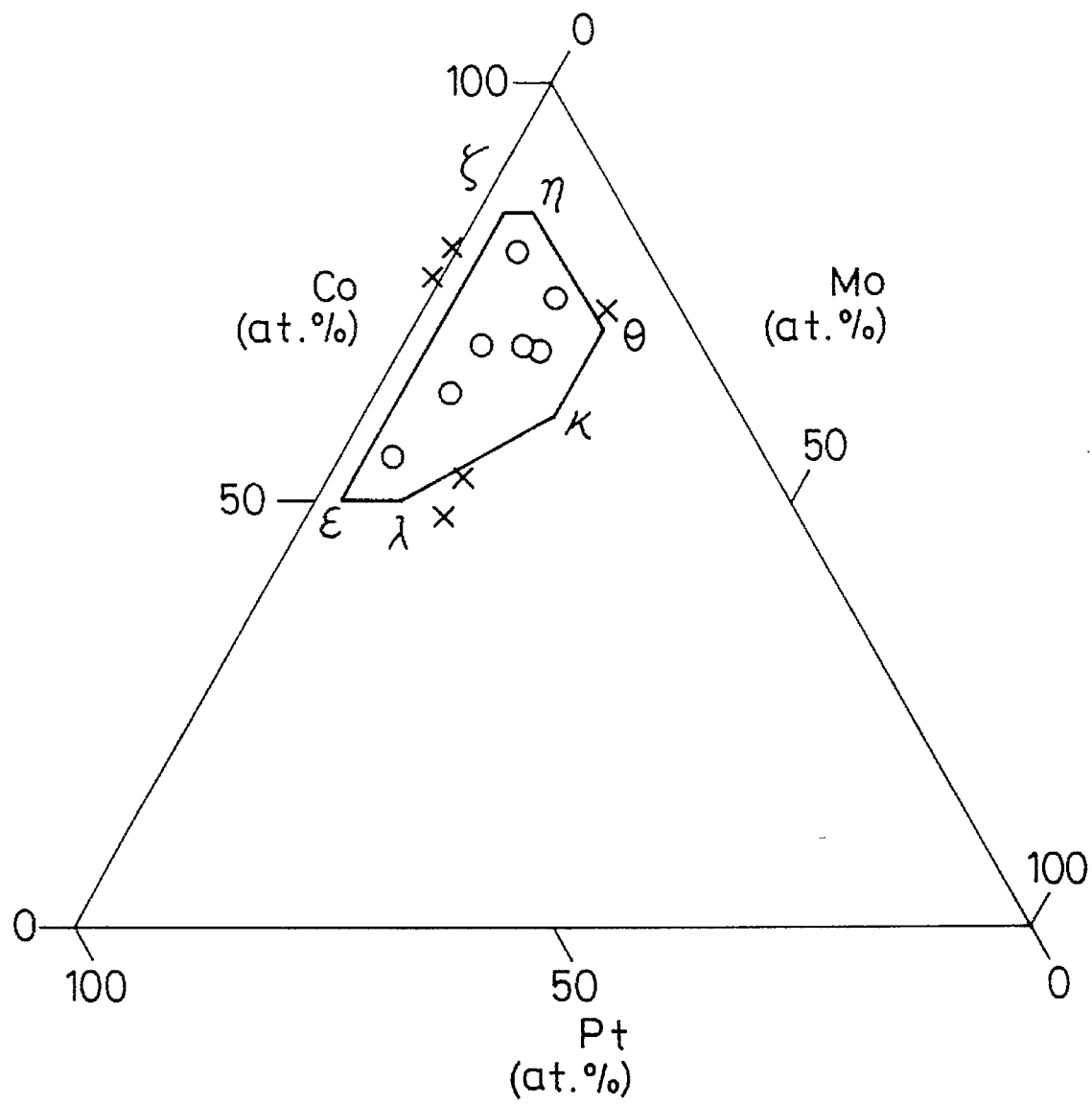

FIG. 7 shows the compositions of the CoPt and CoPtMo layers thus deposited as Examples 44 to 50 and Comparative Examples 27 to 31. In FIG. 7, the bottom line indicates the compositional ratio of Pt (the left end is 100 atomic % and the right end is 0 atomic %), the left declined line indicates the compositional ratio of Co (the upper end is 100 atomic % and the lower end is 0 atomic %), and the right declined line indicates the compositional ratio of Mo (the lower end is 100 atomic % and the upper end is 0 atomic %). The marks ○ stand for Examples 44 to 50 and the marks × stand for Comparative Examples 27 to 31.

The compositions of the deposited CoPt and CoPtMo layers were determined by Auger electron analysis. Various magnetic properties of the layers were measured and evaluated using a Circular Polarization Modification Kerr Spectrum Measuring Apparatus, a vibrating sample magnetometer (VSM) and a magnetic torquemeter.

The thus obtained compositions and properties of the deposited layers are shown in Table 6. In Table 6, the compositions are in atomic %. $K_{eff}$ in $10^6$ erg/cc stands for the effective magnetic anisotropy, in which the positive value indicates the direction perpendicular to the magnetic layer. It should be noted that the $k_{eff}$ was obtained by the value measured by the magnetic torquemeter divided by the volume of the magnetic layer but correction for demagnetic energy was not carried out. $H_s$ stands for a perpendicular saturation magnetic field, i.e., an external magnetic field which makes the magnetization of a magnetic layer saturated when the external magnetic field is applied perpendicularly to the magnetic layer. $H_c$ in kOe stands for the perpendicular coercive force and $\theta_k$ in deg stands for the absolute value of the saturated Kerr rotation angle measured with a wavelength of 400 nm.

In Comparative Examples 44 to 50, the effective magnetic anisotropies were negative, but they were positive in Examples 27 to 31.

TABLE 6

| Sample No. | Composition (atom %) | | | Magnetic properties | | | |
|---|---|---|---|---|---|---|---|
| | Co | Pt | Mo | $K_{eff}$ ($10^6$ erg/cc) | $H_s$ (kOe) | $H_c$ (kOe) | $\theta_k$ (deg.) |
| Ex. 44 | 79.8 | 13.8 | 6.3 | 1.43 | 0.6 | 0.4 | 0.36 |
| Ex. 45 | 69.0 | 22.8 | 8.3 | 1.77 | 0.1 | 0.5 | 0.33 |
| Ex. 46 | 63.2 | 29.0 | 7.8 | 0.88 | 0.8 | 0.8 | 0.37 |
| Ex. 47 | 67.2 | 19.3 | 13.5 | 2.18 | 0.3 | 0.3 | 0.29 |
| Ex. 48 | 55.5 | 39.4 | 5.1 | 1.00 | 4.0 | 1.1 | 0.39 |
| Ex. 49 | 68.1 | 17.2 | 14.7 | 2.11 | 2.0 | 0.4 | 0.27 |
| Ex. 50 | 74.6 | 12.6 | 12.8 | 0.82 | 2.0 | 0.3 | 0.25 |
| Com. Ex. 27 | 80.2 | 19.8 | 0.0 | −3.10 | 2.5 | 0.5 | 0.50 |
| Com. Ex. 28 | 77.4 | 22.6 | 0.0 | −2.60 | 1.5 | 0.6 | 0.48 |
| Com. Ex. 29 | 52.0 | 32.5 | 15.6 | −0.97 | 1.2 | 0.0 | 0.28 |
| Com. Ex. 30 | 72.2 | 9.4 | 18.4 | −1.05 | 2.0 | 0.3 | 0.20 |
| Com. Ex. 31 | 48.5 | 36.9 | 14.6 | −0.32 | 3.0 | 1.0 | 0.26 |

Example 51 and Comparative Examples 32 to 39

In a chamber of a DC sputtering apparatus a complex target of Pt chips or Pt and Nb chips on a Co target (100 mm diameter) was set in accordance with the composition of a layer to be deposited. A silicon substrate was set on a support faciing the complex target. The atmosphere in the chamber was Ar with a pressure of 0.67 Pa or 1.3 P. Sputtering was conducted at a discharge power of 100 W to deposit a CoPt or CoPtNb alloy layer with a thickness of 7 to 11 nm onto a 20 nm AlSiN amorphous dielectric layer formed on the silicon substrate. The X-ray diffraction analysis revealed that the deposited CoPtNb alloy layers were polycrystalline.

Figure 8:
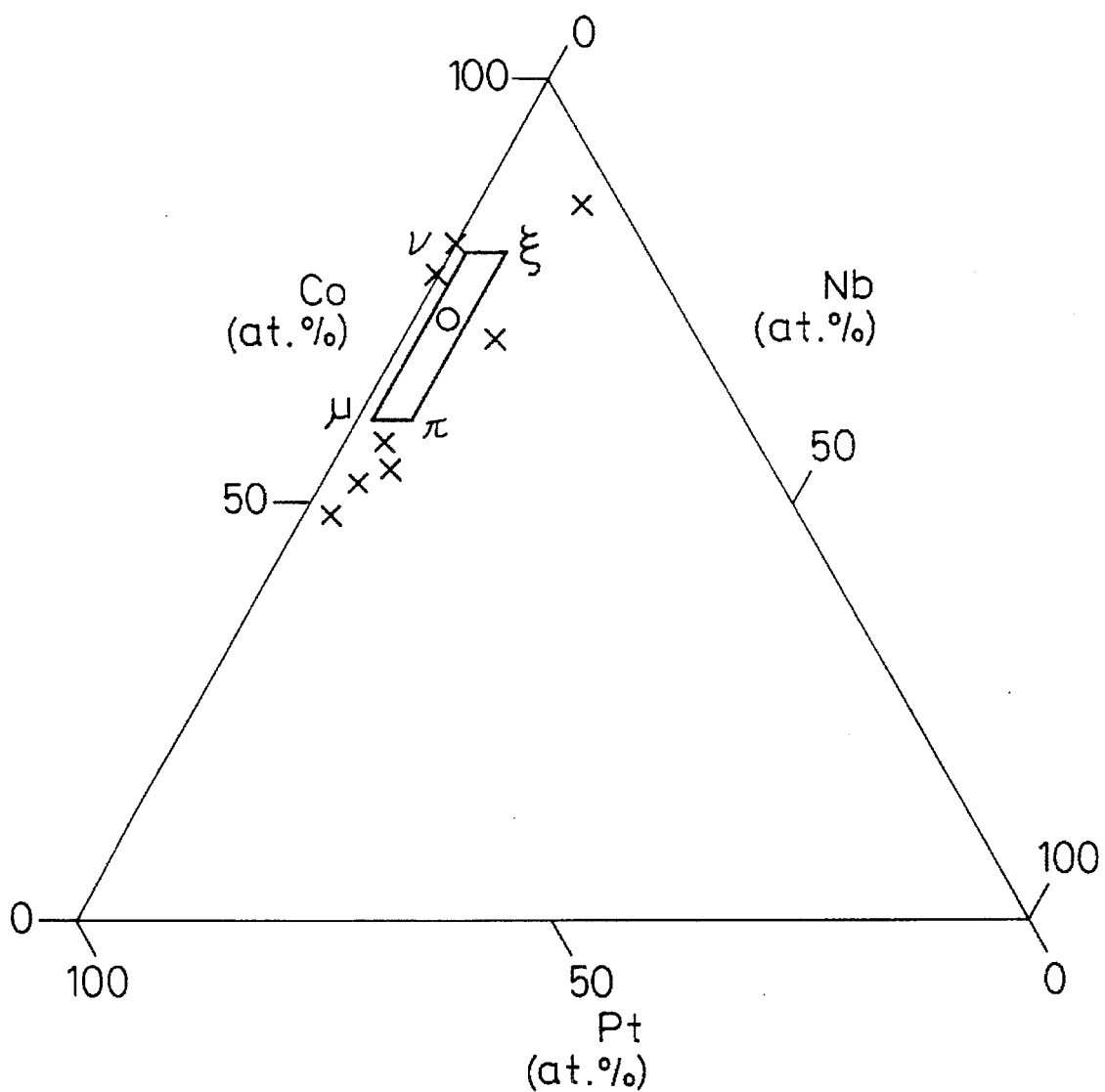

FIG. 8 shows the compositions of the CoPt and CoPtNb layers thus deposited as Example 51 and Comparative Examples 32 to 39. In FIG. 8, the bottom line indicates the compositional ratio of Pt (the left end is 100 atomic % and the right end is 0 atomic %), the left declined line indicates the compositional ratio of Co (the upper end is 100 atomic % and the lower end is 0 atomic %), and the right declined line indicates the compositional ratio of Nb (the lower end is 100 atomic % and the upper end is 0 atomic %). The marks ○ stands for Example 51 and the marks × stand for Comparative Examples 32 to 39.

The compositions of the deposited CoPt and CoPtNb layers were determined by Auger electron analysis. Various magnetic properties of the layers were measured and evaluated using a Circular Polarization Modification Kerr Spectrum Measuring Apparatus, a vibrating sample magnetometer (VSM) and a magnetic torquemeter.

The thus obtained compositions and properties of the deposited layers are shown in Table 7. In Table 7, the compositions are in atomic %. $K_{eff}$ in $10^6$ erg/cc stands for the effective magnetic anisotropy, in which the positive value indicates the direction perpendicular to the magnetic layer. It should be noted that the $k_{eff}$ was obtained by the value measured by the magnetic torquemeter divided by the volume of the magnetic layer but correction for demagnetic energy was not carried out. $H_s$ stands for a perpendicular saturation magnetic field, i.e., an external magnetic field which makes the magnetization of a magnetic layer saturated when the external magnetic field is applied perpendicularly to the magnetic layer. $H_c$ in kOe stands for the perpendicular coercive force and $\theta_k$ in deg stands for the absolute value of the saturated Kerr rotation angle measured with a wavelength of 400 nm.

In Comparative Example 51, the effective magnetic anisotropies were negative, but they were positive in Examples 32 to 39.

TABLE 7

| Sample No. | Composition (atom %) | | | Magnetic properties | | | |
|---|---|---|---|---|---|---|---|
| | Co | Pt | Nb | $K_{eff}$ ($10^6$ erg/cc) | $H_s$ (kOe) | $H_c$ (kOe) | $\theta_k$ (deg.) |
| Ex. 51 | 73.1 | 24.1 | 2.8 | 0.55 | 0.3 | 0.4 | 0.45 |
| Com. Ex. 32 | 80.2 | 19.8 | 0.0 | −3.10 | 2.5 | 0.5 | 0.50 |
| Com. Ex. 33 | 77.4 | 22.6 | 0.0 | −2.60 | 1.5 | 0.6 | 0.48 |
| Com. Ex. 34 | 55.9 | 38.7 | 5.4 | −4.85 | 0.3 | 0.1 | 0.39 |
| Com. Ex. 35 | 48.0 | 48.8 | 3.1 | −1.78 | 1.2 | 0.5 | 0.44 |
| Com. Ex. 36 | 85.4 | 3.5 | 11.2 | −7.15 | 12.0 | 0.5 | 0.29 |
| Com. Ex. 37 | 53.5 | 42.4 | 4.1 | −4.48 | 10.0 | 0.4 | 0.33 |
| Com. Ex. 38 | 59.1 | 38.1 | 2.8 | −1.54 | 6.0 | 0.9 | 0.44 |
| Com. Ex. 39 | 69.2 | 20.9 | 9.8 | −6.70 | 11.0 | 0.2 | 0.33 |

Examples 52 to 53 and Comparative Examples 40 to 47

In a chamber of a DC sputtering apparatus a complex target of Pt chips or Pt and Ta chips on a Co target (100 mm diameter) was set in accordance with the composition of a layer to be deposited. A silicon substrate was set on a support faciing the complex target. The atmosphere in the chamber was Ar with a pressure of 0.67 Pa or 1.3 P. Sputtering was conducted at a discharge power of 100 W to deposit a CoPt or CoPtTa alloy layer with a thickness of 7 to 11 nm onto a 20 nm AlSiN amorphous dielectric layer formed on the silicon substrate. The X-ray diffraction analysis revealed that the deposited CoPtW alloy layers were polycrystalline.

Figure 9:
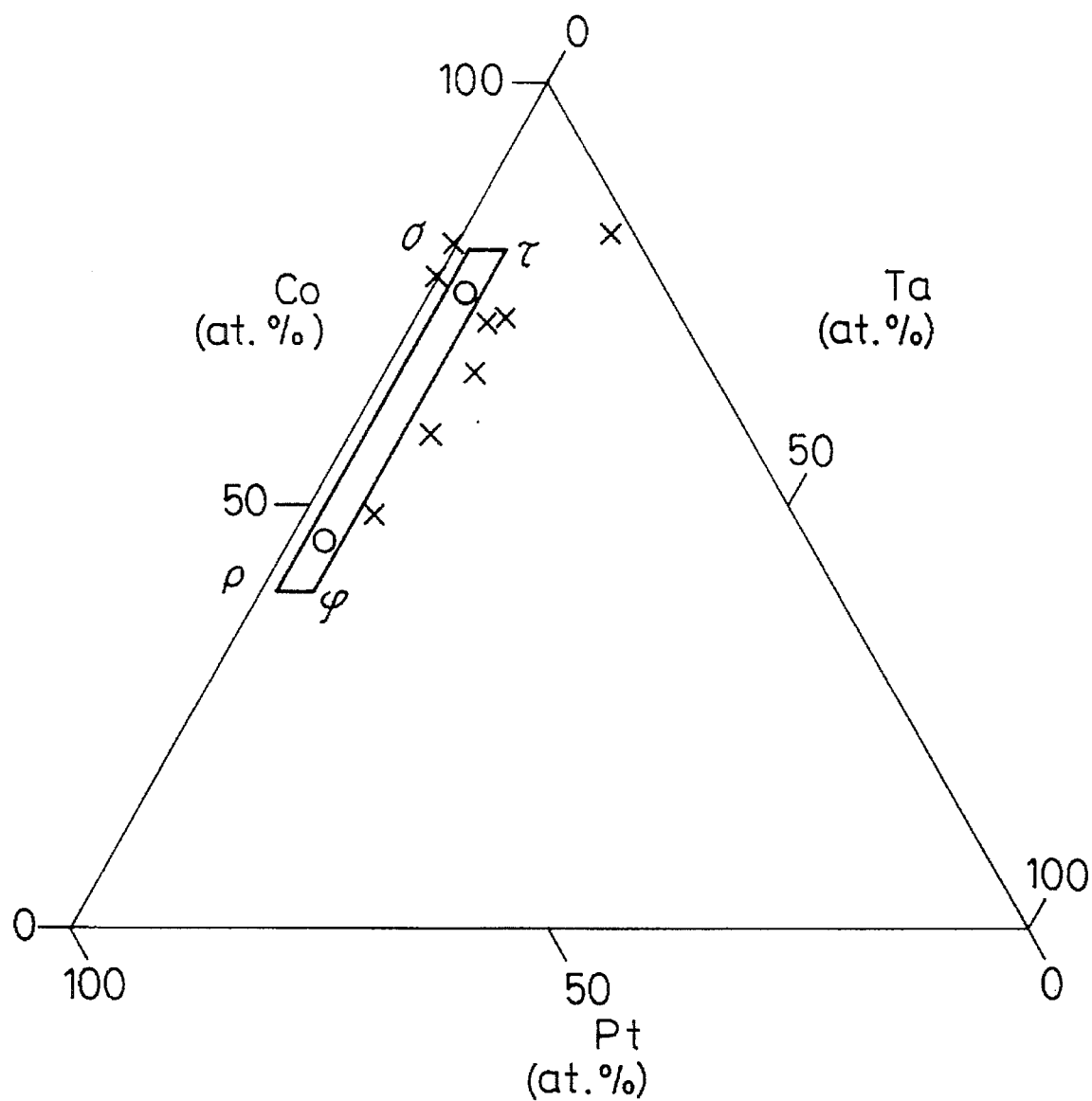

FIG. 9 shows the compositions of the CoPt and CoPtTa layers thus deposited as Examples 52 to 53 and Comparative Examples 40 to 47. In FIG. 9, the bottom line indicates the compositional ratio of Pt (the left end is 100 atomic % and the right end is 0 atomic %), the left declined line indicates the compositional ratio of Co (the upper end is 100 atomic % and the lower end is 0 atomic %), and the right declined line indicates the compositional ratio of Ta (the lower end is 100 atomic % and the upper end is 0 atomic %). The marks ○ stand for Example 52 to 53 and the marks × stand for Comparative Examples 40 to 47.

The compositions of the deposited CoPt and CoPtTa layers were determined by Auger electron analysis. Various magnetic properties of the layers were measured and evaluated using a Circular Polarization Modification Kerr Spectrum Measuring Apparatus, a vibrating sample magnetometer (VSM) and a magnetic torquemeter.

The thus obtained compositions and properties of the deposited layers are shown in Table 8. In Table 8, the compositions are in atomic %. $K_{eff}$ in $10^6$ erg/cc stands for the effective magnetic anisotropy, in which the positive value indicates the direction perpendicular to the magnetic layer. It should be noted that the $k_{eff}$ was obtained by the value measured by the magnetic torquemeter was divided by the volume of the magnetic layer but correction for demagnetic energy was not carried out. $H_s$ stands for a perpendicular saturation magnetic field, i.e., an external magnetic field which makes the magnetization of a magnetic layer saturated when the external magnetic field is applied perpendicularly to the magnetic layer. $H_c$ in kOe stands for the perpendicular coercive force and $\theta_k$ in deg stands for the absolute value of the saturated Kerr rotation angle measured with a wavelength of 400 nm.

In Comparative Examples 52 to 53, the effective magnetic anisotropies were negative, but they were positive in Examples 40 to 47.

TABLE 8

| Sample No. | Composition (atom %) | | | Magnetic properties | | | |
|---|---|---|---|---|---|---|---|
| | Co | Pt | Ta | $K_{eff}$ ($10^6$ erg/cc) | $H_s$ (kOe) | $H_c$ (kOe) | $\theta_k$ (deg.) |
| Ex. 52 | 75.0 | 21.8 | 3.2 | 0.67 | 0.2 | 0.3 | 0.44 |
| Ex. 53 | 46.7 | 50.4 | 2.9 | 1.09 | 0.2 | 0.8 | 0.45 |
| Com. Ex. 40 | 80.2 | 19.8 | 0.0 | −3.10 | 2.5 | 0.5 | 0.50 |
| Com. Ex. 41 | 77.4 | 22.6 | 0.0 | −2.60 | 1.5 | 0.6 | 0.48 |
| Com. Ex. 42 | 49.3 | 43.1 | 7.6 | −4.95 | 0.8 | 0.0 | 0.37 |
| Com. Ex. 43 | 58.4 | 33.8 | 7.8 | −5.15 | 0.3 | 0.0 | 0.38 |

TABLE 8-continued

| Sample No. | Composition (atom %) | | | Magnetic properties | | | |
|---|---|---|---|---|---|---|---|
| | Co | Pt | Ta | $K_{eff}$ ($10^6$ erg/cc) | $H_s$ (kOe) | $H_c$ (kOe) | $\theta_k$ (deg.) |
| Ex. 43 Com. Ex. 44 | 65.6 | 24.5 | 9.9 | −4.99 | 0.5 | 0.0 | 0.39 |
| Com. Ex. 45 | 81.3 | 3.6 | 15.1 | −6.62 | 12.0 | 0.2 | 0.29 |
| Com. Ex. 46 | 73.4 | 20.8 | 5.8 | −0.60 | 1.0 | 0.3 | 0.43 |
| Com. Ex. 47 | 72.3 | 18.4 | 9.3 | −5.50 | 12.0 | 0.5 | 0.31 |

We claim:

1. A magneto-optical layer of a polycrystalline tertiary or quaternary alloy, having an easy magnetization axis perpendicular to the surface of the magneto-optical layer and having a composition represented by one of the following:

(i) $Co_aPt_bRu_c$ where $20 \leq a \leq 70$, $10 \leq b \leq 70$, $10 \leq c \leq 60$ and a+b+c=100;

(ii) $Co_dPt_eRe_f$ where $d \leq 80$, $5 \leq e$, $5 \leq f$, $40 \leq 4d-5f$ and d+e+f=100;

(iii) $Co_gPt_hRe_iRu_j$ where
$15 \leq g(2g+2h+j)/(2g+2h) \leq 80$
$5 \leq h(2g+2h+j)/(2g+2h)$,
$5 \leq i+(j/2)$,
$2g(2g+2h+j)/(2g+2h) \leq 3i+(3j/2)$,
g+h+i+j=100, and
ghij≠0;

(iv) $Co_kPt_lQ_m$ where $30 \leq k \leq 75$, $1 \leq l \leq 20$ and k+l+m= 100, (v) $Co_nPt_pMo_q$ where $50 \leq n \leq 85$, $10 \leq p$, $3 \leq q \leq 20$, n−q≥40 and n+p+q=100;

(vi) $Co_rPt_sNb_t$ where $60 \leq r \leq 80$, $1 \leq c \leq 5$, and r+s+t=100; and (vii) $Co_uPt_vTa_w$ wherein $40 \leq u \leq 80$, $1 \leq w \leq 5$, and u+v+w=100, wherein the magneto-optical layer has a perpendicular saturated magnetic field of 6 kOe or less.

2. A magneto-optical layer according to claim 1, having a composition of $Co_aPt_bRu_c$ where $20 \leq a \leq 70$, $10 \leq b \leq 70$, $10 \leq c \leq 60$ and a+b+c=100.

3. A magneto-optical layer according to claim 2, wherein $20 \leq a \leq 40$, $10 \leq b \leq 30$, and $40 \leq c \leq 60$.

4. A magneto-optical recording medium comprising a substrate, and
a magneto-optical recording layer as set forth in claim 1 on the substrate.

5. A magneto-optical recording medium comprising a substrate, and
a magneto-optical recording layer as set forth in claim 2 on the substrate.

6. A magneto-optical recording medium comprising a substrate, and
a magneto-optical recording layer as set forth in claim 3 on the substrate.

7. A magneto-optical layer according to claim 1, having a composition of $Co_dPt_eRe_f$ where $d \leq 80$, $5 \leq e$, $5 \leq f$, $40 \leq 4d-5f$ and d+e+f=100.

8. A magneto-optical layer according to claim 7, wherein $d \leq 75$, $5 \leq e \leq 45$, $5 \leq f$ and $40 \leq 4d-5f$.

9. A magneto-optical layer according to claim 7, wherein $d \leq b$ 70, $10 \leq e \leq 45$, $5 \leq f$ and $d \geq 3f$.

10. A magneto-optical layer according to claim 1, having a composition of $Co_g Pt_h Re_i Ru_j$ where $15 \leq g(2g+2h+j)/(2g+2h) \leq 80$ $5 \leq h(2g+2h+j)/(2g+2h)$, $5 \leq i+(j/2)$, $2g(2g+2h+j)/(2g+2h) \leq 3i+(3j/2)$, $g+h+i+j=100$, and $ghij \neq 0$.

11. A magneto-optical layer according to claim 1, having a composition of $CO_k Pt_l W_m$ where $30 \leq k \leq 75$, $1 \leq l \leq 20$ and $k+l+m=100$.

12. A magneto-optical layer according to claim 1, having a composition of $Co_n Pt_p Mo_q$ where $50 \leq n \leq 85$, $10 \leq p$, $3 \leq q \leq 20$, $n-q \geq 40$ and $n+p+q=100$.

13. A magneto-optical layer according to claim 1, having a composition of $Co_r Pt_s Nb_t$ where $60 \leq r \leq 80$, $1 \leq c \leq 5$, and $r+s+t=100$.

14. A magneto-optical layer according to claim 1, having a composition of $Co_u Pt_v Ta_w$ wherein $40 \leq u \leq 80$, $1 \leq w \leq 5$, and $u+v+w=100$.

15. A magneto-optical recording medium comprising a substrate, and a magneto-optical recording layer as set forth in claim 7 on the substrate.

16. A magneto-optical recording medium comprising a substrate, and a magneto-optical recording layer as set forth in claim 8 on the substrate.

17. A magneto-optical recording medium comprising a substrate, and a magneto-optical recording layer as set forth in claim 9 on the substrate.

18. A magneto-optical recording medium comprising a substrate, and a magneto-optical recording layer as set forth in claim 10 on the substrate.

19. A magneto-optical recording medium comprising a substrate, and a magneto-optical recording layer as set forth in claim 11 on the substrate.

20. A magneto-optical recording medium comprising a substrate, and a magneto-optical recording layer as set forth in claim 12 on the substrate.

21. A magneto-optical recording medium comprising a substrate, and a magneto-optical recording layer as set forth in claim 13 on the substrate.

22. A magneto-optical recording medium comprising a substrate, and a magneto-optical recording layer as set forth in claim 14 on the substrate.

* * * * *